April 7, 1970     K. H. MARTENSSON ETAL     3,505,145
DEVICE AND A METHOD FOR SEPARATING OFF PIECES OF STRIP-SHAPED
THERMOPLASTIC MATERIAL, SAID PIECES BEING APPLIED TO A WEB OF
MATERIAL IN THE FORM OF COVERING WAFERS, LABELS OR THE LIKE
Filed Oct. 22, 1965     2 Sheets-Sheet 1

INVENTORS
KJELL HALVARD MARTENSSON
HANS GEORG MELLE
BY

ATTORNEY

April 7, 1970 K. H. MARTENSSON ETAL 3,505,145
DEVICE AND A METHOD FOR SEPARATING OFF PIECES OF STRIP-SHAPED
THERMOPLASTIC MATERIAL, SAID PIECES BEING APPLIED TO A WEB OF
MATERIAL IN THE FORM OF COVERING WAFERS, LABELS OR THE LIKE
Filed Oct. 22, 1965 2 Sheets-Sheet 2

INVENTORS
KJELL HALVARD MARTENSSON
HANS GEORG MELLE
BY
*Earle R. Marden*
ATTORNEY United States Patent Office 3,505,145
Patented Apr. 7, 1970

3,505,145
DEVICE AND A METHOD FOR SEPARATING OFF PIECES OF STRIP - SHAPED THERMOPLASTIC MATERIAL, SAID PIECES BEING APPLIED TO A WEB OF MATERIAL IN THE FORM OF COVERING WAFERS, LABELS OR THE LIKE
Kjell Halvard Martensson, Malmo, and Hans Georg Melle, Lund, Sweden, assignors to AB Tetra Pak, Lund, Sweden, a Swedish company
Filed Oct. 22, 1965, Ser. No. 501,695
Claims priority, application Switzerland, Dec. 4, 1964, 15,695/64
Int. Cl. B32b 31/04
U.S. Cl. 156—265       4 Claims

ABSTRACT OF THE DISCLOSURE

Method to apply and heat seal a strip of material to a moving web of material by automatically supplying and severing the strip of material from a roll of such material.

---

The present invention relates to a device for separating off pieces of a strip-shaped thermoplastic material, said pieces being applied to a web of material moved forward continuously or intermittenly and being in the form of covering wafers, labels or the like.

In several industrial fields there is a problem in applying labels, wafers or the like to a web. These labels or wafers may for instance be marking labels, price-tags or covering wafers with the aid of which an opening or a cut in the web is covered and resealed. The latter case occurs for instance when packages are manufactured from a web of material, said packages being provided with an opening notch consisting of one or more wafers which are disposed over an opening or cut in the package wall. An opening notch of the kind mentioned above is preferably made already in the web of material which is meant to be converted into packages, it being possible to apply the wafers by means of a device according to the invention.

In a previously proposed device the material to be provided with wafers or the like, e.g. packaging material, is advanced between two rollers together with the wafer material, which consists of a thermoplastically coated paper web. The thermoplastic material is heated by a special heating device, as a result of which there takes place adhesion between the wafer material and the packaging material. When applying a wafer both materials are advanced a distance, whereupon the wafer material is cut off so that a suitable piece of the wafer material is applied to the packaging material.

In this device there is used a thermoplastically coated paper material for manufacturing the wafers or labels. Even if it is possible to use also other materials than paper, the field of use is still restricted to the cases where the said wafers or labels have a side of nonthermoplastic material.

The present invention aims at eliminating these and other drawbacks by means of a suitable device which is characterized by two synchronously rotable means, one of which acts as a stepwise advancing means for the thermoplastic strip while the other, which is heatable, cuts off and receives a piece of the strip and applies the said piece to the web of material.

The invention is further characterized by the fact that two similar devices of the kind described above are disposed each on one side of the web of material, whereby both sides of the web are provided with covering wafers. Additional characteristics of the invention will appear from the following embodiments chosen by way of example and shown in the diagrammatical figures of the appended drawing, where—

Figure 1:
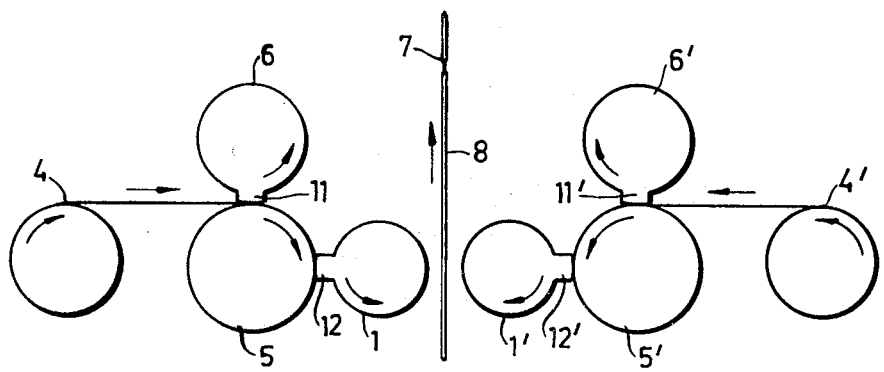
Figure 2:
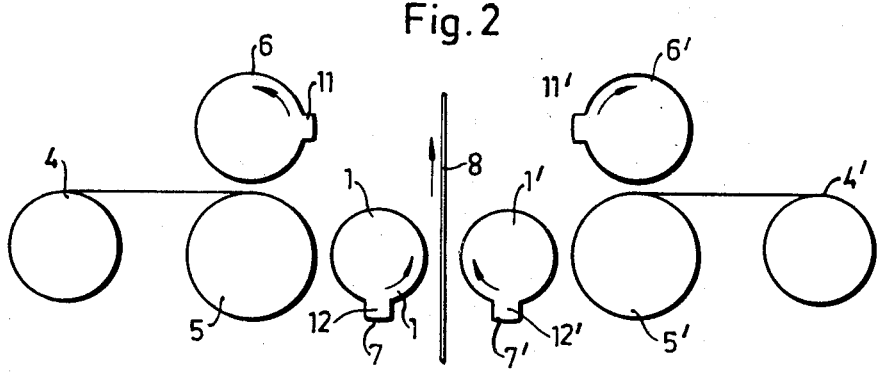
Figure 3:
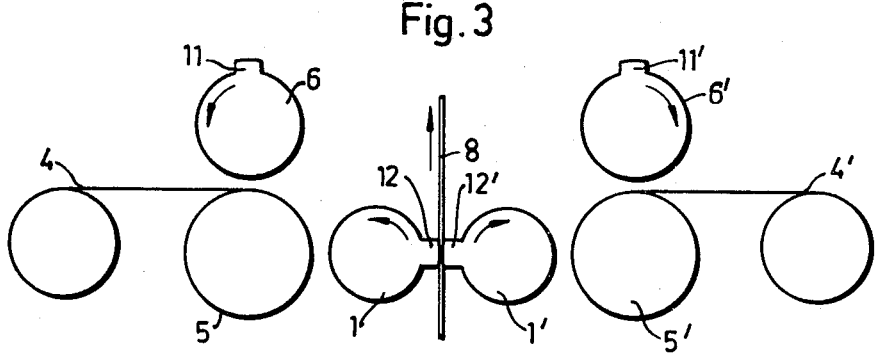
Figure 4:
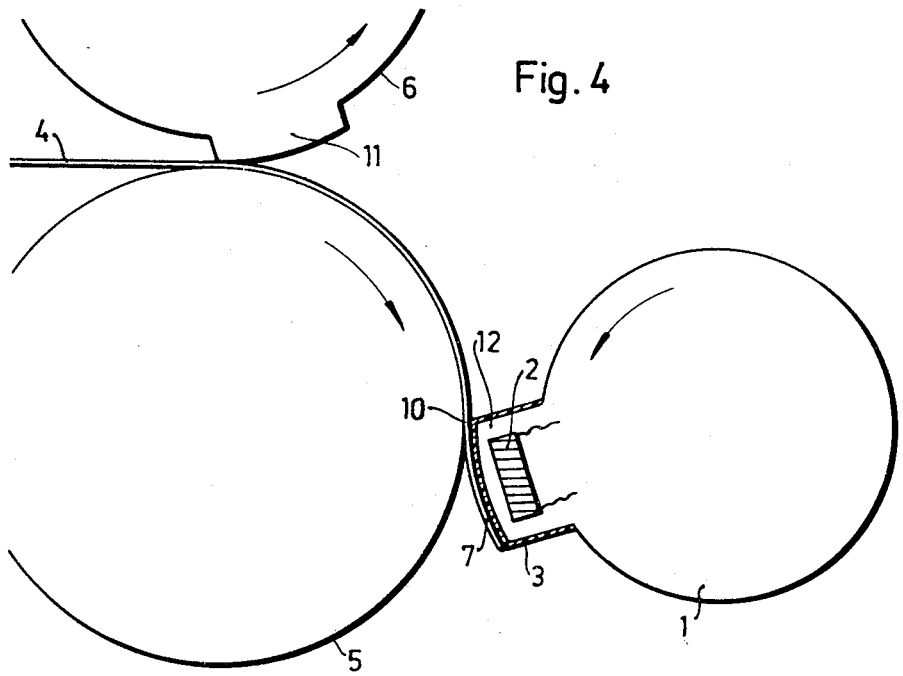
Figure 5:
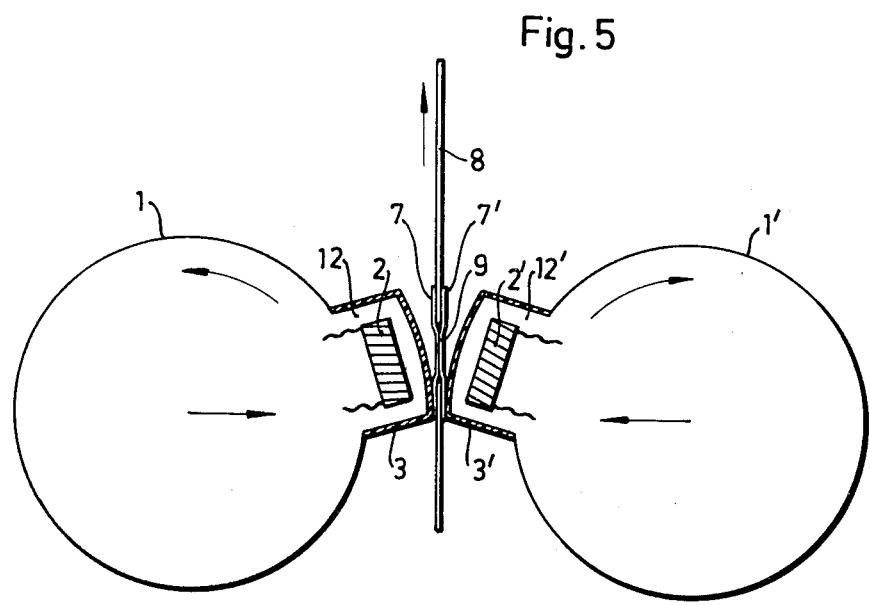

FIGS. 1, 2 and 3 show the function of the device according to a preferred embodiment, and
FIGS. 4 and 5 show details of the device.

FIGS. 1 to 3 thus show how a strip-shaped thermoplastic material 4, 4', e.g. polyethylene, is wound off from a roller by means of a feeding roller 6, 6' provided with a projecting portion 11, 11'. The roller 6, 6' is meant to rotate, whereby the strip-shaped material 4, 4' is advanced at each turn of the roller 6, 6' a distance corresponding to the length of the curved line of the portion 11, 11'. A roller 1, 1' also has a projecting portion 12, 12'. This portion is heated to a suitable temperature for the purpose of receiving a piece of the strip-shaped material on its surface. There is also an abutment roller 5, 5'. The device is symmetrical with regard to the web of material 8 which is to be provided with wafers, labels or the like, which are obtained from the strip-shaped material 4, 4'.

In FIG. 1 the stepwise advancing of the strip material 4, 4' has just begun. The rollers 6, 6' feed the strip material and the rollers 5, 5' a distance forward, at the same time as the projecting heated portions 12, 12' of the rollers 1, 1' rest against and receive a piece 7, 7' of the strip material. The directions of movement are shown by the arrows. When the strip material has been advanced one step, the rollers 6, 6' and 1, 1' continue their rotary movement, FIG. 2, while the rollers 5, 5' are stationary. The thermoplastic strip material is now in a semi-fused state, in the form of wafer-like pieces 7, 7' received by the projecting portions 12, 12'. Finally, FIG. 3 shows how the wafers are applied to the web of material 8, the rollers 1, 1' acting as abutments for each other.

FIG. 4 shows in greater detail how a piece of strip material may be received and cut off. With the geometric configuration of the rollers according to the figure, the strip material 4 is meant to rest permanently against the roller 5 along a fourth of the periphery thereof. The projecting portion 12 of the roller 1 is heated to a suitable temperature by means of heating elements 2. In order that the piece 7 may once more be removed from the roller 1 the projecting portion 12 is covered with a suitable material 3, for instance the material sold under the name of Teflon. The rollers 6 and 1 rotate synchronously with each other, and the projecting portions 11 and 12 of the two rollers come into contact with the thermoplastic strip at the same time. The portion 11 advances the strip a distance, at the same time as an equally large piece 4 adheres to the portion 12. The strip is fused off at 10 by braking of the strip material when the roller 5 ceases to rotate and the advancing movement stops. Due to the fact that the Teflon material covering the portion 12 is heated the fused-off strip is retained and obtains a suitable temperature before being applied to the web material 8. How this applictaion takes place should be clearly visible from FIG. 5. Due to the fact that an opening 9 in the strip material 8 is provided with a wafer from both sides, very good sealing is obtained since the wafers will adhere to the material surrounding the opening 9 and will also adhere to each other.

Although polyethylene at present seems to be one of the most suitable materials to use in a device according to the invention, it is not improbable that other materials may be produced which may turn out to be better for this purpose. Also, certain modifications may be made in the device within the scope of the invention. The portion 12 may for instance be provided with another material than Teflon. It is also possible to let a piece of the strip material remain at the portion 12 by means of, for instance, suction means. In the embodiment shown the rotary means are designed as projecting portions, each on one roller. It will be realized that these rollers may be shaped in another way or may be dispensed with completely, in which case some other form of means increasing the inertia may be provided.

That which is claimed is:

1. A method of applying strips of thermoplastic material to an advancing continuous web of material comprising the steps of: continuously advancing a web of material, supplying thermoplastic strip material to a first rotating surface, rotating said rotating surface and said thermoplastic material toward a second rotating surafce, severing a portion of said thermoplastic material by slowing the rotation of said first rotating surface when contacted by said second rotating surface, transferring said severed portion of said thermoplastic material to said second surface, rotating said second surface toward said web of material and heat sealing said severed portion of thermoplastic material to said web of material.

2. The method of claim 1 wherein heat is supplied to said second rotating surface.

3. The method of claim 1 wherein a third rotating surface is rotated in synchronism with said first rotating surface to advance said strip of thermoplastic material toward said second rotating surface.

4. The method of claim 3 wherein heat is supplied to said second rotating surface.

References Cited

UNITED STATES PATENTS

| | | | |
|---|---|---|---|
| 2,543,220 | 2/1951 | Ardell | 156—521 |
| 2,483,458 | 10/1949 | Fischer et al. | 156—521 |
| 3,159,521 | 12/1964 | Pechmann | 156—519 |
| 1,977,046 | 10/1934 | Cumfer | 156—265 |

FOREIGN PATENTS 995,119   8/1951   France.

DOUGLAS J. DRUMMOND, Primary Examiner

U.S. Cl. X.R.
83—23; 156—519; 225—4